United States Patent
Duncan

(10) Patent No.: US 7,630,450 B2
(45) Date of Patent: Dec. 8, 2009

(54) OFDM CHANNEL ESTIMATOR

(75) Inventor: Stephen Howard Duncan, Devon (GB)

(73) Assignee: Motorola, Inc., Schaumburg, IL (US)

( * ) Notice: Subject to any disclaimer, the term of this patent is extended or adjusted under 35 U.S.C. 154(b) by 597 days.

(21) Appl. No.: 11/422,643

(22) Filed: Jun. 7, 2006

(65) Prior Publication Data

US 2006/0285600 A1  Dec. 21, 2006

Related U.S. Application Data

(60) Provisional application No. 60/691,081, filed on Jun. 16, 2005.

(51) Int. Cl.
*H04K 1/10* (2006.01)
(52) U.S. Cl. .................................................... 375/260
(58) Field of Classification Search ................ 375/260, 375/340; 370/208, 210; 455/63.1, 67.13
See application file for complete search history.

(56) References Cited

U.S. PATENT DOCUMENTS

| 7,248,559 B2 * | 7/2007 | Ma et al. ..................... 370/208 |
| 2007/0159959 A1 * | 7/2007 | Song et al. ................... 370/208 |

FOREIGN PATENT DOCUMENTS

GB    WO 98/37649    *    8/1998

OTHER PUBLICATIONS

Jukka Rinne, Ali Hazmi and Markku Renfors, "Impulse Burst Position Detection and Channel Estimation Schemes for OFDM Systems", Tampere University, Finland and Nokia, Jun. 19, 2003, IEEE.*

Wei Zhang, Xiang-Gen Xia, P.C CHing and Wing-Kin Ma, "On the Number of Pilots for OFDM System in Multipath Fading Channels", The Chinese University of Hong Kong, University of Delaware, 2004 IEEE.*

Wei Zhang, Xiang-Gen Xia and P.C Ching, "Clustered Pilot Tones for Carrier Frequency Offset Compensation in OFDM Systems", The Chinese University of Hong Kong, University of Delaware, European Signal Processing Conference, Sep. 2004 IEEE.*

Ove Edfors, et al. "OFDM Channel Estimation by Singular Value Decomposition" IEEE Transactions on Communications, IEEE Service Center, Piscataway, NJ; vol. 46, No. 7, July 1998; XP011009204, ISSN:0090-6778, Figure 3.

PCT Search Report Dated Oct. 4, 2006; copy inadvertently not included with IDS/RCE filed Jun. 8, 2009.

* cited by examiner

*Primary Examiner*—Chieh M Fan
*Assistant Examiner*—Aristocratis Fotakis
(74) *Attorney, Agent, or Firm*—Lalita W. Pace; Anthony P. Curtis

(57) ABSTRACT

The channel estimation technique employs a set of pilot tones to determine channel state information. Because some of the pilot tones contained in the OFDM symbols may be missing after transmission, the disclosed technique employs a set of known pilot tones to compute an estimate of the channel impulse response, which may exhibit a level of distortion. Non-zero terms of the estimated channel impulse response that fall outside of a prescribed time window are regarded as artifacts of a set of missing or unknown pilot tones. Information relating to the known pilot tones and the artifacts of the unknown pilot tones are employed for mathematically reconstructing and deriving values of the unknown tones. Then, the values of the known pilot tones and the derived values of the unknown pilot tones are employed to recompute the channel impulse response, thereby obtaining the channel estimate with a reduced level of distortion.

27 Claims, 6 Drawing Sheets

OFDM CHANNEL ESTIMATOR

CROSS REFERENCE TO RELATED APPLICATIONS

This application claims benefit of U.S. Provisional Patent Application No. 60/691,081 filed Jun. 16, 2005 entitled OFDM CHANNEL ESTIMATOR.

STATEMENT REGARDING FEDERALLY SPONSORED RESEARCH OR DEVELOPMENT

Not applicable

BACKGROUND OF THE INVENTION

The present invention relates generally to high performance wireless broadband communications systems, and more specifically to an improved technique for performing channel estimation in wireless broadband communications systems.

U.S. patent application Ser. No. 11/115,943 filed Apr. 27, 2005 entitled MULTIPLE INPUT MULTIPLE OUTPUT (MIMO) WIRELESS COMMUNICATIONS SYSTEM (the "'943 application") and assigned to the same assignee of the present invention discloses a high performance wireless broadband communications system that is configurable as a line-of-sight (LOS) or non-line-of-sight (NLOS) system. As disclosed in the '943 application, the wireless broadband communications system includes at least one transmitter disposed at one end of a communications link, and at least one receiver disposed at the other end of the link. The transmitter is operative to send data signals over one or more communications channels using specified space-time coding and modulation techniques. The receiver is operative to capture the transmitted signals, and to employ specified signal processing techniques to decode and demodulate the signals to recover user data. Both the LOS and NLOS configurations of the disclosed system employ adaptive modulation techniques to adjust selected transmission parameters such as the coding rate and the modulation mode, thereby compensating for changes in channel characteristics that may adversely affect the quality and/or the rate of data transmission.

The wireless broadband communications system disclosed in the '943 application typically compensates for changes in channel characteristics based at least in part upon the states of signal propagation paths corresponding to the respective channels. For example, to determine the states of the propagation paths, the disclosed system typically employs pilot carriers in an orthogonal frequency division modulation (OFDM) waveform to transmit pilot signals along the respective paths over orthogonal channels. To assure that channel state information can be determined separately for each orthogonal channel, separate sets of frequencies or "tones" may be employed when transmitting the pilot signals over the respective channels. The transmitter disposed at one end of the communications link operates to modulate and transmit the pilot signals over the respective channels, and the receiver disposed at the other end of the link operates to receive and demodulate the pilot signals, which provide a phase reference for data carriers in the OFDM waveform. The disclosed system can employ the pilot signals to obtain an estimate of the impulse response of each channel, which may subsequently be used by the system to select the transmission parameters for a given communications session. In addition, the system can employ the phase reference provided by the pilot signals to increase the accuracy of signal demodulation at the receiver.

However, the use of pilot carriers in an OFDM waveform to perform channel estimation or to provide a phase reference for signal demodulation in wireless broadband communications systems can be problematic because, due to various factors, one or more of the pilot tones may be suppressed, corrupted, or otherwise missing at the receiver. One such factor is adjacent channel interference (ACI), which can prohibit the transmission of significant power in one or more of the pilot tones near the edges of a frequency band. Other factors include processing noise and analog errors, which can corrupt pilot tones at zero frequency (DC). Corrupted, suppressed, or missing pilot tones can cause truncation effects, which may result in distortions of both the channel impulse response and the channel frequency response. For example, such truncation effects may be manifested as a "blurring" of the channel impulse response. If this blurring of the channel impulse response extends beyond a specified window of the impulse response, then the corresponding channel frequency response may exhibit "ringing" near the edges of the frequency band. In addition, if the number of pilot tones is reduced to enhance spectral efficiency, then the distortions of the channel impulse response and the channel frequency response may be increased. Because such corrupted, suppressed, or missing pilot tones can cause distortions of the channel estimate, it can be difficult at best to select optimal parameters for signal transmission and to assure high accuracy of signal demodulation in wireless broadband communications systems.

It would therefore be desirable to have an improved technique for performing channel estimation in wireless broadband communications systems.

BRIEF SUMMARY OF THE INVENTION

In accordance with the present invention, an improved technique is provided for performing channel estimation in a wireless broadband communications system. The presently disclosed channel estimation technique allows estimates of the channel impulse response and the channel frequency response to be obtained with reduced distortion, even in cases where corrupted, suppressed, or missing pilot tones are observed at the system receiver. The disclosed channel estimation technique can operate with a reduced number of pilot tones, thereby allowing wireless broadband communications systems to operate with increased spectral efficiency.

In one embodiment, the presently disclosed channel estimation technique is employed in a wireless broadband communications system including at least one transmitter, at least one receiver, and a plurality of transmit and receive antennas, which are configured and arranged to transmit and receive signals over one or more communications channels. For example, at least one transmitter and a least one transmit antenna may be disposed at one end of a communications link, and at least one receiver and at least one receive antenna may be disposed at the other end of the link. The disclosed channel estimation technique may be employed to obtain information relating to the state of one or more signal propagation paths corresponding to each channel available to the wireless communications system, which may subsequently use the channel state information to select transmission parameters for a given communications session and/or to increase the accuracy of signal demodulation.

In one mode of operation, the disclosed channel estimation technique employs at least one set of pilot tones to determine the channel state information, in which the set of pilot tones is a subset of pilot carriers within an orthogonal frequency division modulation (OFDM) symbol structure. The transmitter and the transmit antenna disposed at one end of the communications link operate to modulate and transmit the OFDM symbols including the set of pilot tones along at least one propagation path over at least one orthogonal channel, and the receiver and the receive antenna disposed at the other end of the link operate to receive and demodulate the OFDM symbols. Because some of the pilot tones contained in the OFDM symbols may be corrupted, suppressed, or otherwise missing after transmission, the receiver may capture a subset of the transmitted pilot tones. This subset of the transmitted pilot tones is designated as the set of "known" pilot tones. The disclosed technique employs the set of known pilot tones to compute a first estimate of the channel impulse response. Because this estimate of the channel impulse response is computed using only the set of known pilot tones, the first channel estimate may exhibit a level of distortion. In the disclosed embodiment, the delay spread of each channel is limited to a prescribed window of time domain samples of the transmitted symbols, and the actual undistorted channel impulse response is assumed to be equal to zero outside of the prescribed time window. Non-zero terms of the first estimate of the channel impulse response that fall outside of the prescribed time window are therefore regarded as artifacts of a set of missing or "unknown" pilot tones. The disclosed technique employs information relating to the known pilot tones and the artifacts of the unknown pilot tones for mathematically reconstructing and deriving values of the unknown tones. The disclosed technique then employs the values of the known pilot tones and the derived values of the unknown pilot tones to recompute the channel impulse response, thereby obtaining the channel estimate with a reduced level of distortion.

By mathematically reconstructing pilot tones that may be corrupted, suppressed, or otherwise missing at the system receiver, the presently disclosed channel estimation technique can obtain the channel estimate with a reduced level of distortion. As a result, wireless broadband communications systems employing the disclosed technique can perform demodulation of fine signal modulations, e.g., 64 QAM or 256 QAM, with higher accuracy. In addition, because the disclosed channel estimation technique can operate using a reduced number of pilot tones, wireless communications systems employing the disclosed technique can operate with increased spectral efficiency.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

An improved technique is disclosed for performing channel estimation in a wireless broadband communications system. The presently disclosed channel estimation technique mathematically reconstructs pilot tones that may be corrupted, suppressed, or otherwise missing at the system receiver to obtain estimates of the channel impulse response and the channel frequency response with reduced levels of distortion. Wireless broadband communications systems employing the disclosed channel estimation technique can perform demodulation of fine signal modulations with higher accuracy. Wireless communications systems performing the disclosed technique can also employ a reduced number of pilot tones to achieve increased spectral efficiency.

Figure 1:
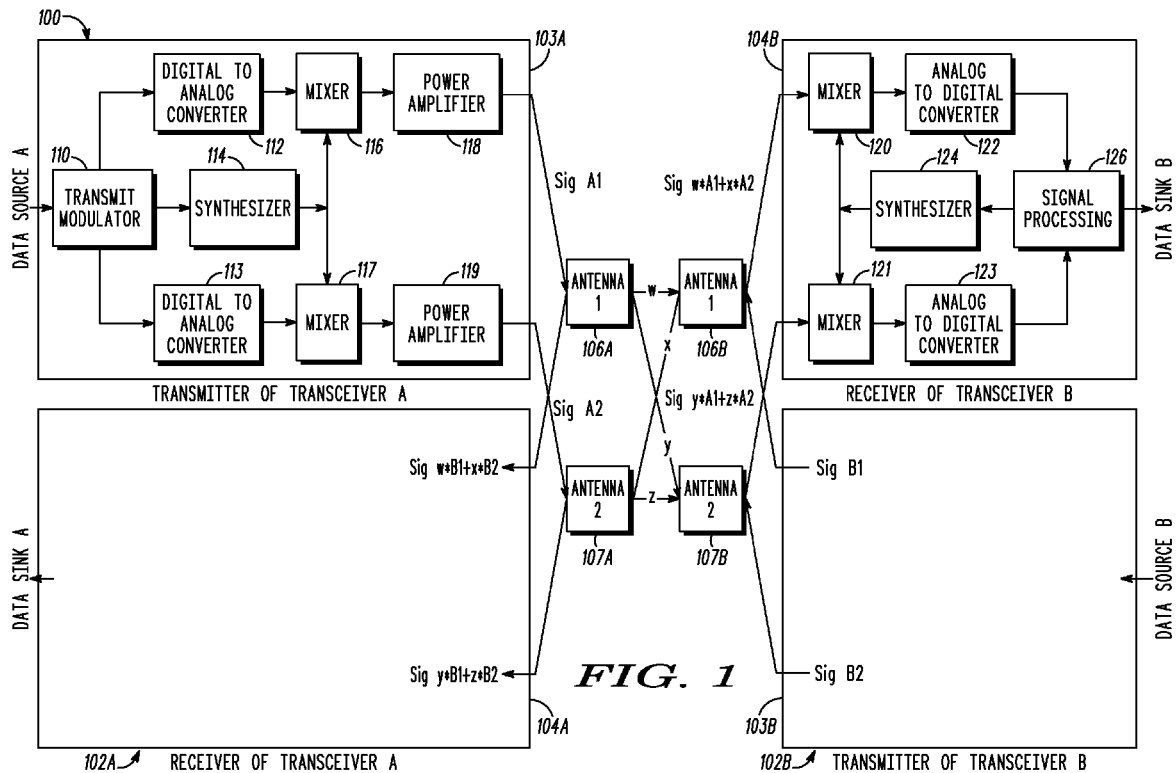
FIG. 1 is a block diagram of a wireless broadband communications system in which the presently disclosed channel estimation technique may be employed, in accordance with an embodiment of the present invention.

FIG. 1 depicts an illustrative embodiment of a wireless broadband communications system 100, in which the presently disclosed channel estimation technique may be employed. In the illustrated embodiment, the wireless broadband communications system 100 includes a plurality of transceivers 102A-102B and a plurality of high gain antennas 106A-107A, 106B-107B. It is understood that the transceiver 102A and the high gain antennas 106A-107A may be disposed at one end of a communications link (not numbered), and the transceiver 102B and the high gain antennas 106B-107B may be disposed at the other end of the link. The wireless communications system 100 can be configured as a 1:2 single input multiple output (SIMO) system operative to transmit and receive signals over a single channel of information flow, or as a 2:2 multiple input multiple output (MIMO) system operative to transmit and receive signals over two channels of information flow. It should be appreciated, however, that the wireless communications system 100 can alternatively be configured as a 1:4 SIMO system, a 1:n SIMO system, a 2:4 MIMO system, a 2:n MIMO system, an n:n MIMO system, or any other suitable type of SIMO or MIMO system.

As shown in FIG. 1, the wireless communications system 100 includes the transceiver 102A operatively connected to the antennas 106A-107A at one end of the communications link, and the transceiver 102B operatively connected to the antennas 106B-107B at the other end of the link. The antennas 106A-107A, 106B-107B are operative to transmit and receive signals propagating along up to four signal paths w, x, y, z between the respective ends of the link. The transceiver 102A includes a transmitter 103A and a low noise receiver 104A, and the transceiver 102B includes a transmitter 103B and a low noise receiver 104B. The transmitter 103A includes the following functional components: a transmit modulator 110, digital-to-analog (D-to-A) converters 112-113, a frequency synthesizer 114, mixers 116-117, and power amplifiers 118-119. It is understood that the transmitter 103B can include the same functional components as the transmitter 103A. FIG. 1 depicts only the functional components of the transmitter 103A for clarity of illustration.

Specifically, a data source A provides user data to the transmit modulator 110, which provides modulated data outputs to the D-to-A converters 112-113 and controls the operation of the synthesizer 114. The D-to-A converters 112-113 convert the outputs of the transmit modulator 110 to analog signals, and provide the analog signals to the mixers 116-117. Next, the synthesizer 114 provides suitable synthesized carriers to the mixers 116-117, which mix up the analog signals to wireless frequencies. The power amplifiers 118-119 then amplify the wireless signals, and provide the amplified signals to the antennas 106A-107A for subsequent transmission over the communications link.

The receiver 104B includes the following functional components: mixers 120-121, analog-to-digital (A-to-D) converters 122-123, a frequency synthesizer 124, and a signal processing unit 126. It is understood that the receiver 104A can include the same functional components as the receiver 104B. FIG. 1 depicts only the functional components of the receiver 104B for clarity of illustration. Specifically, the wireless signals received by the antennas 106B-107B are provided to the mixers 120-121, respectively, which mix the signals to analog baseband signals using suitable synthesized frequencies generated by the synthesizer 124. Next, the A-to-D converters 122-123 convert the analog baseband signals to digital baseband signals. The signal processing unit 126 then processes (e.g., decodes and demodulates) the digital signals to recover the user data, which is subsequently provided to a data sink B. The signal processing unit 126 also controls the operation of the synthesizer 124. In one embodiment, the signal processing unit 126 operates as a maximum ratio combiner (MRC; also known as an optimum combiner), which combines the signals by conceptually rotating the phase of each signal to be in alignment, and then adjusting the amplitude of each signal to maximize the combined signal-to-noise ratio.

It is noted that the data sources A-B and the data sinks A-B may comprise respective connections to one or more local area networks (LANs) or routers. Alternatively, the data sources A-B and the data sinks A-B may comprise direct connections to respective user devices. In addition, each one of the transceivers 102A-102B may be implemented as a software-defined radio. For example, the transmit modulator 110 included in each transmitter 103A-103B may employ channel modulation waveforms that are defined in software, and the signal processing unit 126 included in each receiver 104A-104B may demodulate the channel waveforms using demodulation techniques that are defined in software. It should therefore be appreciated that the functions necessary to implement the transceivers 102A-102B may be embodied in whole or in part using hardware or software or some combination thereof using signal processors, micro-controllers, microprocessors, or any other suitable hardware and/or software. The various components of the wireless communications system 100 of FIG. 1 are further described in co-pending U.S. patent application Ser. No. 11/115,943 filed Apr. 27, 2005 entitled MULTIPLE INPUT MULTIPLE OUTPUT (MIMO) WIRELESS COMMUNICATIONS SYSTEM (the "'943 application").

Figure 2:
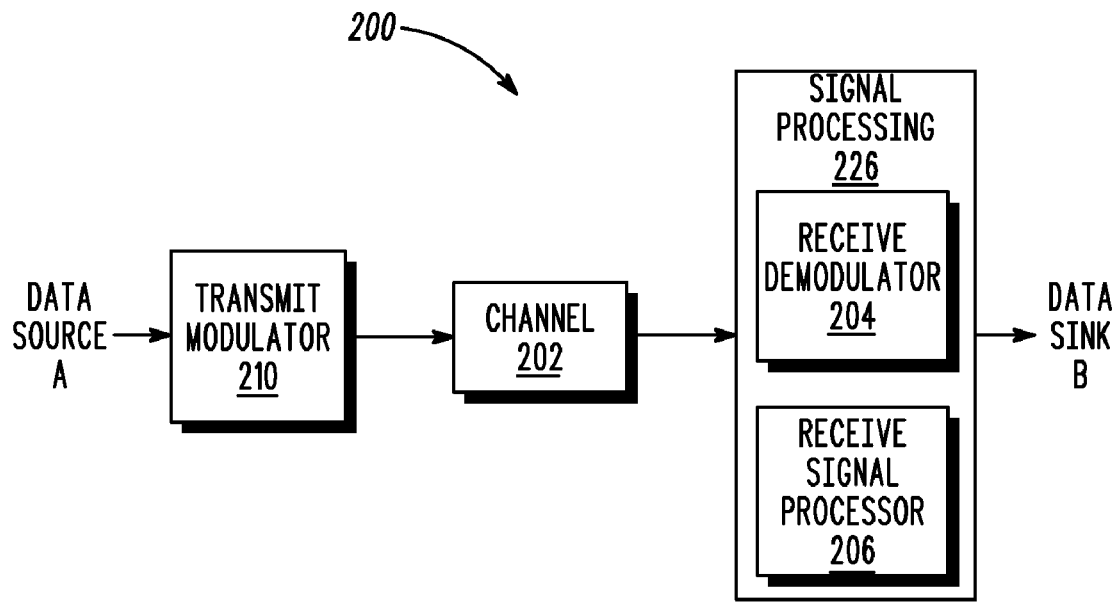
FIG. 2 is a block diagram of a wireless signal modulation/demodulation sub-system within the system of FIG. 1, in which the disclosed channel estimation technique may be implemented.

FIG. 2 depicts an illustrative embodiment of a wireless signal modulation-demodulation sub-system 200, in which the presently disclosed channel estimation technique may be implemented. As shown in FIG. 2, the signal modulation-demodulation sub-system 200 includes a transmit modulator 210, and a signal processing unit 226 including a receive demodulator 204 and a receive signal processor 206. In the presently disclosed embodiment, the transmit modulator 210 generally corresponds to the transmit modulator 110 included in the transmitter 103A or 103B (see FIG. 1), and the signal processing unit 226 generally corresponds to the signal processing unit 126 included in the receiver 104A and 104B (see FIG. 1). As further shown in FIG. 2, at least one representative channel 202 is disposed between the transmit modulator 210 and the signal processing unit 226. The channel 202 represents one of the communications channels available to the wireless communications system 100. The receive signal processor 206 is operative to perform the disclosed channel estimation technique to obtain information relating to the current state of the channel 202 including estimates of the channel impulse response and the channel frequency response, which may subsequently be used by the sub-system 200 to select transmission parameters for a given communications session and/or to increase the accuracy of signal demodulation.

In accordance with the present invention, the disclosed channel estimation technique employs at least one set of pilot tones to determine channel state information, in which the set of pilot tones is a subset of carriers in an orthogonal frequency division modulation (OFDM) symbol structure. For example, the transmitter 103A and the transmit antenna 106A included in the wireless communications system 100 (see FIG. 1) may be employed to modulate and transmit the OFDM symbols including the set of pilot tones along at least one of the propagation paths w, x, y, z over at least one orthogonal channel, and the receiver 104B and the receive antenna 106B may be employed to receive and demodulate the OFDM symbols. The receiver 104B includes multiple sets of matched filters (not shown), and each set of pilot tones and each receive antenna is associated with a respective set of matched filters. Because some of the pilot tones contained in the OFDM symbols may be corrupted, suppressed, or otherwise missing after transmission, the receiver 104B may capture a subset of the transmitted pilot tones. This subset of pilot tones captured at the receiver 104B is designated as the set of "known" pilot tones. In the presently disclosed embodiment, the signal processing unit 126 included in the receiver 104B performs the channel estimation technique using the known pilot tones to compute a first estimate of the channel impulse response. Because this estimate of the channel impulse response is computed using only the set of known pilot tones, it may exhibit a level of distortion. In the disclosed embodiment, the delay spread of each channel is limited to a prescribed window of time domain samples of the transmitted symbols, and the actual undistorted impulse response of the channel is assumed to be equal to zero outside of the prescribed time window. The delay spread is defined herein as the difference between the earliest time of arrival and the latest time of arrival of the transmitted symbols at the receiver 104B. Because the actual impulse response is assumed to be zero outside of the prescribed time window, non-zero terms of the first estimate of the channel impulse response that fall outside of the prescribed window are regarded as artifacts of a set of missing or "unknown" pilot tones. The disclosed channel estimation technique employs information relating to the known pilot tones and the artifacts of the unknown pilot tones for mathematically reconstructing and deriving values of the unknown tones. The disclosed technique then employs the values of the known pilot tones and the derived values of the unknown pilot tones to recompute the channel impulse response, thereby obtaining the channel estimate with a reduced level of distortion.

Figure 3:
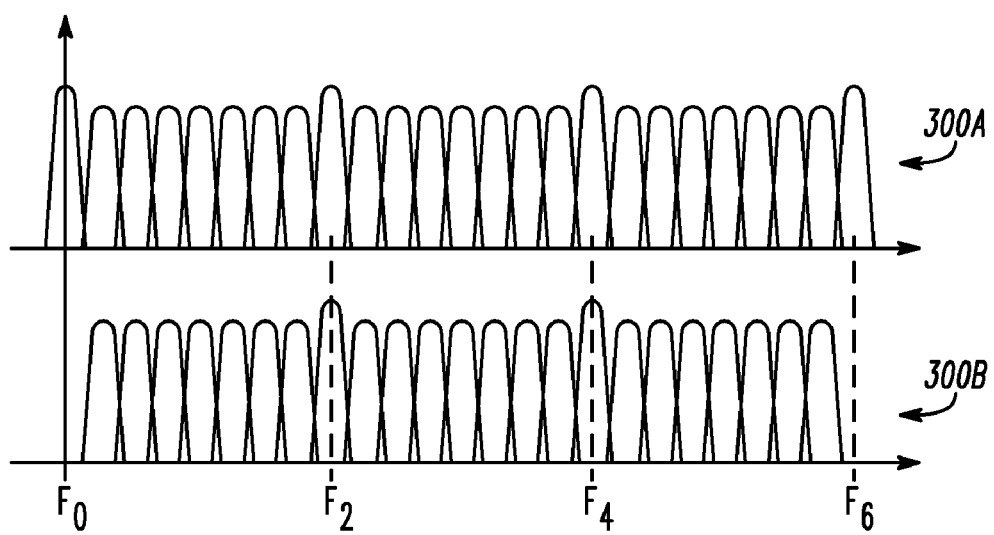
FIG. 3 illustrates pilot tone structures that may be employed by the disclosed channel estimation technique to determine channel state information.

FIG. 3 depicts illustrative pilot tone structures 300A-300B that may be employed by the disclosed channel estimation technique. Specifically, the upper diagram of FIG. 3 illustrates the spectrum of the pilot tone structure 300A that may be transmitted by the transmitter 103A (see FIG. 1), and the lower diagram of FIG. 3 illustrates the spectrum of the pilot tone structure 300B that may be received by the receiver 104B. As shown in FIG. 3, the pilot tone structure 300A includes a plurality of pilot carriers (e.g., 4) having frequency values $F_0$, $F_2$, $F_4$, and $F_6$, respectively, and a number of data carriers (e.g., 7) at frequency values between the values $F_0$ and $F_2$, $F_2$ and $F_4$, and $F_4$ and $F_6$. As described above, because some of the pilot tones contained in OFDM symbols may be corrupted, suppressed, or missing after transmission, the receiver 104B may capture a subset of the pilot tones transmitted by the transmitter 103A. This is illustrated by the pilot tone structure 300B, which includes the pilot carriers at the frequency values $F_2$ and $F_4$, but does not include the pilot carriers at the frequency values $F_0$ and $F_6$. For example, the wireless communications system 100 may have been prohibited from transmitting significant power in the pilot tone having the frequency value $F_6$ due to adjacent channel interference (ACI). Further, processing noise or analog errors may have corrupted the pilot tone having the frequency value $F_0$. Accordingly, the pilot carriers at the frequency values $F_2$ and $F_4$ form an illustrative set of known pilot tones, and the missing pilot carriers at the frequency values $F_0$ and $F_6$ form an illustrative set of unknown pilot tones. It is appreciated that the wireless communications system 100 may employ any suitable permutation of the number of pilot carriers relative to the data carriers, the position of the pilot carriers within the OFDM spectrum, and the duty cycle of any alternation between pilot carriers and data carriers.

Figure 4:
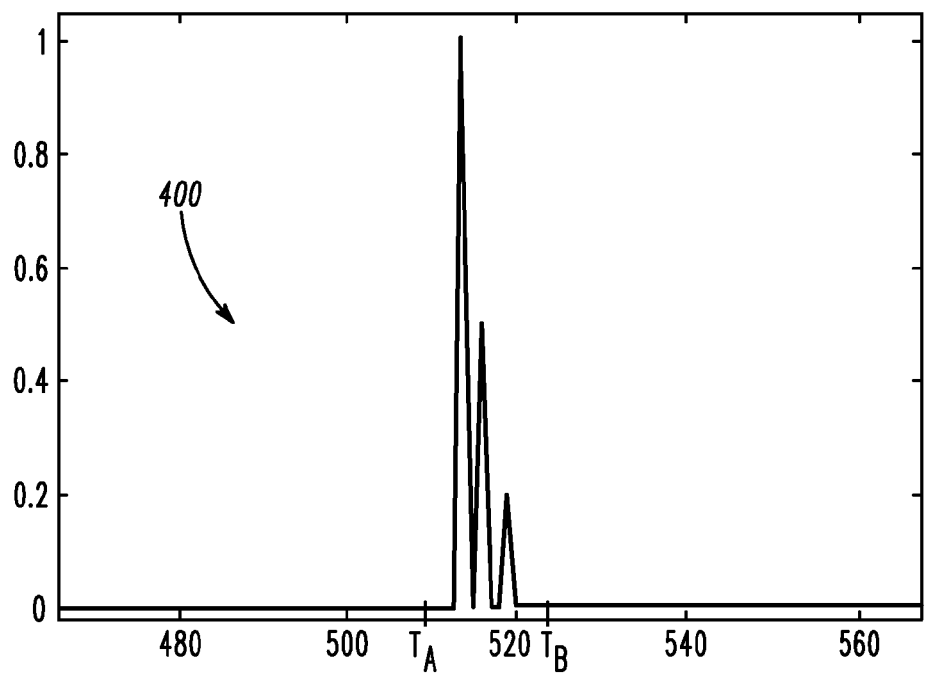
FIG. 4 is a diagram of an exemplary undistorted channel impulse response.
Figure 5:
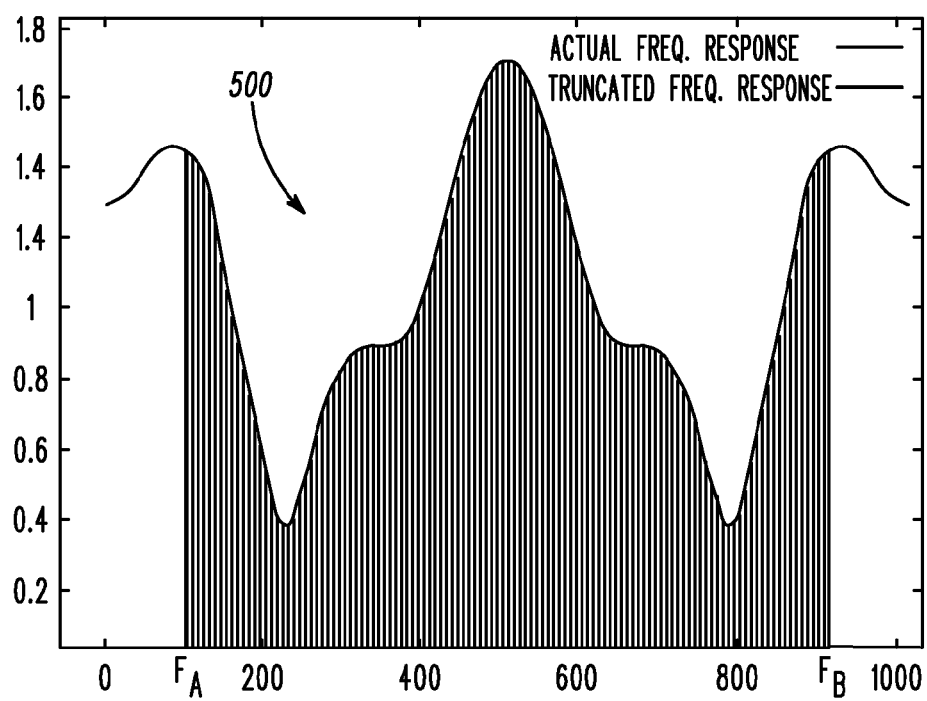
FIG. 5 is a diagram of a truncated channel frequency response corresponding to the exemplary channel impulse response of FIG. 4.

The presently disclosed channel estimation technique will be better understood with reference to the following illustrative example and FIGS. 4-8. FIG. 4 depicts an illustrative actual undistorted impulse response 400 of a representative communications channel within a wireless broadband communications system. As shown in FIG. 4, the channel impulse response 400 includes three peaks, which may correspond to the direct propagation path followed by delayed echoes of a signal transmitted by a transmitter within the wireless communications system. Those of ordinary skill in this art will appreciate that the Fourier transform may be applied to the channel impulse response 400 to obtain a corresponding channel frequency response 500 (see FIG. 5). As illustrated in FIG. 5, the channel frequency response 500 includes a shaded region between frequency values $F_A$ and $F_B$. For example, the frequencies within the shaded region of the channel frequency response 500 may be passed by the filters included in the system receiver and subsequently provided to the receive demodulator. Further, the frequencies that fall outside of the shaded region (i.e., the frequencies having values less than $F_A$ or greater than $F_B$) may be rejected by the receiver filters, and therefore may not be provided to the receive demodulator.

Figure 6:
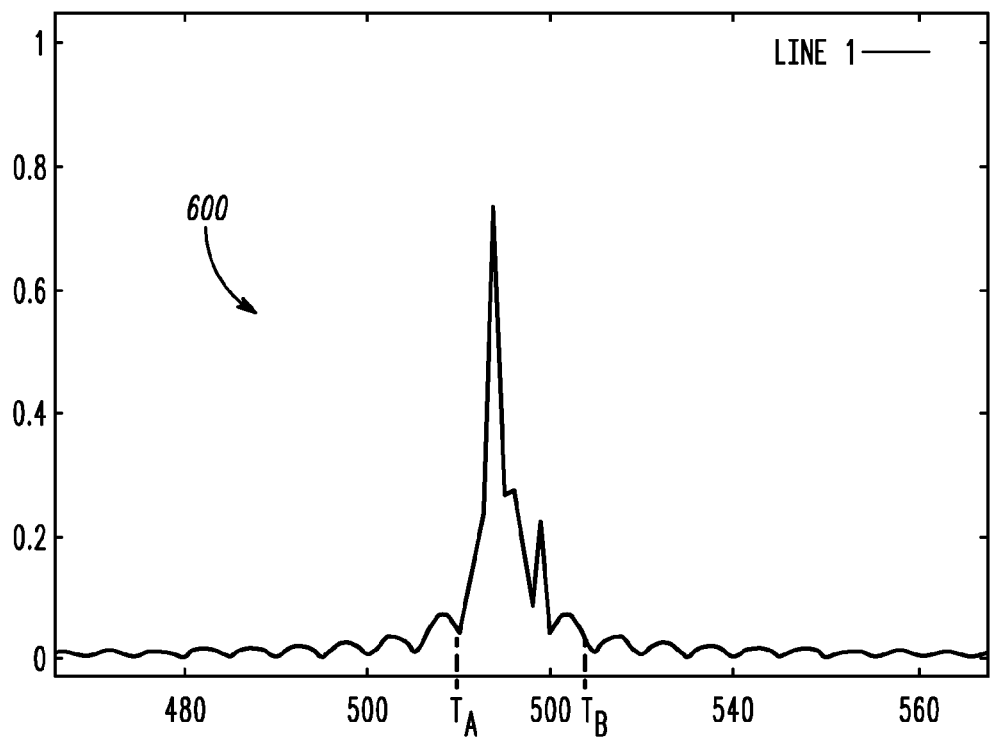
FIG. 6 is a diagram of an exemplary distorted channel impulse response obtained by taking the inverse Fourier transform of the truncated channel frequency response of FIG. 5.
Figure 7:
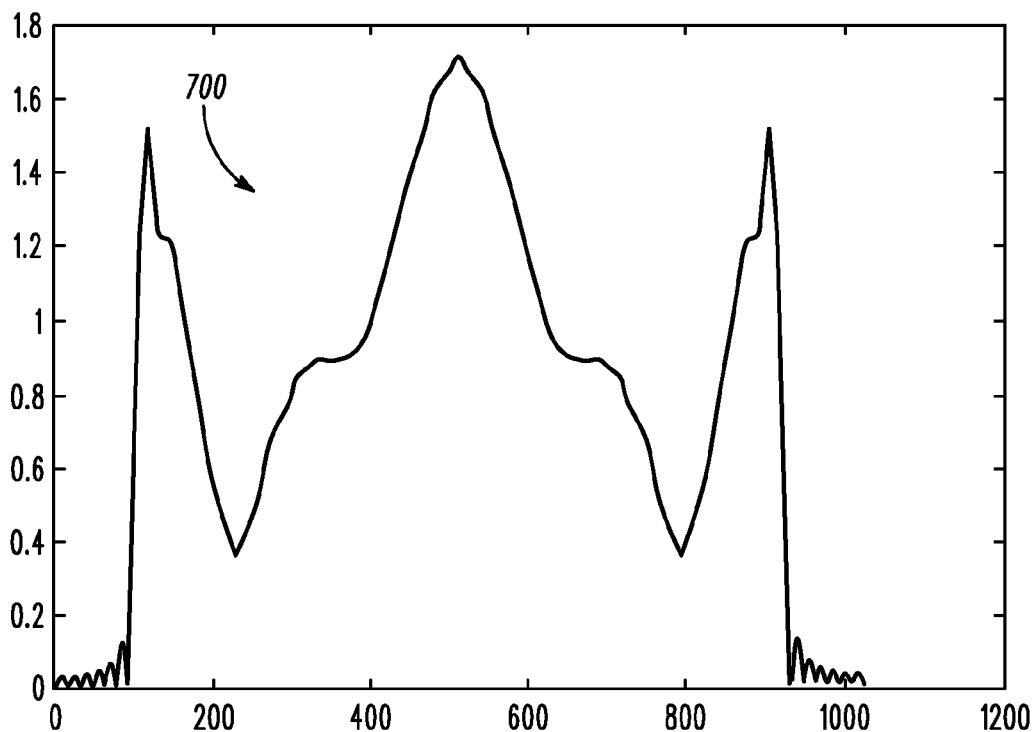
FIG. 7 is a diagram of a distorted channel frequency response corresponding to the exemplary channel impulse response of FIG. 6.

In this example, a set of pilot tones in an OFDM symbol structure is employed by the disclosed channel estimation technique to obtain an estimate of the channel impulse response 400 (see FIG. 4). Specifically, the set of pilot tones is transmitted by the transmitter within the wireless communications system, and at least some of the pilot tones are received by the system receiver. As described above, because some of the pilot tones may be corrupted, suppressed, or missing after transmission, a subset of the transmitted tones may be captured at the receiver. Those of ordinary skill in this art will appreciate that the inverse Fourier transform may be applied to the set of known pilot tones captured at the receiver to compute a first estimate 600 (see FIG. 6) of the channel impulse response 400 (see FIG. 4). As shown in FIG. 6, the first estimate 600 of the channel impulse response 400 exhibits a level of distortion, i.e., "blurring", because it was computed using only the set of known pilot tones. The delay spread of the channel is limited to a prescribed time window $T_A$-$T_B$, the size of which corresponds to the total number of transmitted pilot tones. The level of distortion in the first estimate 600 of the channel impulse response 400 is exhibited within the prescribed time window $T_A$-$T_B$. Because the actual undistorted channel impulse response 400 is assumed to be zero outside of the prescribed time window $T_A$-$T_B$ (see also FIG. 4), the non-zero terms of the computed estimate 600 of the channel impulse response that fall outside of the prescribed window $T_A$-$T_B$ are regarded as artifacts of a set of missing or unknown pilot tones. It is noted that the Fourier transform may be applied to the channel impulse response 600 to obtain a corresponding channel frequency response 700 (see FIG. 7), which also exhibits a level of distortion, i.e., "ringing", near the edges of the frequency band.

The presently disclosed channel estimation technique may be employed for mathematically reconstructing and deriving values of the unknown pilot tones, thereby allowing estimates of the channel impulse response 600 and the corresponding channel frequency response 700 to be obtained with reduced levels of distortion. When practicing the disclosed channel estimation technique, it is assumed that time synchronization of the transmitter and the receiver within the wireless communications system has already been achieved. Specifically, if "$\underline{x}$" represents an N-by-1 vector containing a time domain signal received by the receiver, then the Fourier transform of the vector $\underline{x}$ may be expressed as $$\underline{y} = W\underline{x}, \tag{1}$$

in which "W" represents the matrix of Fourier coefficients, i.e., $$W_{i,j} = \exp(\pm 2\pi ij/N). \tag{2}$$

As described above, the disclosed technique employs the values of the known pilot tones captured at the receiver, and derived values of the unknown pilot tones, to compute the estimate of the channel impulse response with reduced distortion. To that end, the Fourier transform $\underline{y}$ may be expressed as the sum of two sub-vectors, i.e., $$\underline{y} = K\underline{y}_k + U\underline{y}_u, \tag{3}$$

in which "$\underline{y}_k$" represents an $N_k$-by-1 vector of known pilot tones having known values, "$\underline{y}_u$" represents an $N_u$-by-1 vector of unknown pilot tones having unknown values, and "K" and "U" are mapping matrices, as discussed below. It is noted that $$N = N_k + N_u. \tag{4}$$

Using equations (1) and (3) above, the time domain signal $\underline{x}$ may be expressed as $$\underline{x} = W^H (K\underline{y}_k + U\underline{y}_u), \tag{5}$$

in which "$W^H$" is indicative of the Hermitian transpose.

The mapping matrices "K" and "U" may be constructed and employed to map the known and unknown pilot tones, respectively, into their appropriate positions in the Fourier transform $\underline{y}$. For example, if an OFDM symbol containing 6 pilot tones is transmitted by the transmitter, and 4 of the pilot tones are known while the middle 2 pilot tones are unknown at the receiver, then the mapping matrices K and U may be expressed as $$K = \begin{bmatrix} 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \end{bmatrix} \quad (6)$$

$$U = \begin{bmatrix} 0 & 0 \\ 0 & 0 \\ 1 & 0 \\ 0 & 1 \\ 0 & 0 \\ 0 & 0 \end{bmatrix}.$$

In addition, an $N_z$-by-N mapping matrix "Z" may be constructed and employed to select the $N_z$ elements of the channel impulse response that are known to be zero, i.e., $$Z\underline{x} = \underline{0}. \quad (7)$$

For example, if the final three terms of the channel impulse response were known to be zero, then the mapping matrix Z may be expressed as $$Z = \begin{bmatrix} 0 & 0 & 0 & 1 & 0 & 0 \\ 0 & 0 & 0 & 0 & 1 & 0 \\ 0 & 0 & 0 & 0 & 0 & 1 \end{bmatrix}. \quad (8)$$

Using equations (5) and (7) above, the unknown pilot tones $\underline{y}_u$ can be mathematically reconstructed, and values can be derived for the unknown pilot tones $\underline{y}_u$ by expressing the unknown pilot tones as an $N_u$-by-1 vector, for example, $$\underline{y}_u = -(ZW^H U)^{-1} ZW^H K \underline{y}_k, \quad (9)$$

in which "$ZW^H K \underline{y}_k$" is the inverse Fourier transform of the measured pilot tone vector with zeros inserted in locations where the pilot tones are unknown and evaluated only at the positions where the impulse response is known to be zero. It is noted that, in equation (9) above, the expression "$ZW^H K \underline{y}_k$" corresponds to artifacts of the unknown pilot tones, i.e., information from the computed estimate of the channel impulse response that fall outside of the prescribed window $T_A$-$T_B$ (see, e.g., FIG. 6). As indicated in equation (9) above, the vector of unknown pilot tones $\underline{y}_u$ can be expressed in terms of the vector of known pilot tones $\underline{y}_k$. It is noted that the vector of known pilot tones $\underline{y}_k$ represents the Fourier transform of the first estimate of the channel impulse response, which is computed using just the set of known pilot tones captured at the receiver. The presently disclosed channel estimation technique employs the vector $\underline{y}_k$ of known pilot tones, and the vector $\underline{y}_u$ of unknown pilot tones having values as defined in equation (9) above, to obtain the channel estimate with reduced distortion.

It is noted that, in general, the $N_z$-by-$N_u$ matrix "$ZW^H U$" in equation (9) above does not have an inverse. Nonetheless, the matrix $ZW^H U$ can be solved using known singular value decomposition (SVD) techniques, i.e., $$ZW^H U = XSY, \quad (10)$$

in which "X" and "Y" represent orthogonal matrices, and "S" represents a diagonal matrix of singular values. For example, the singular values can be computed using the known SVD function publicly available in the Octave high-level programming language, or using any other suitable technique. Specifically, the inverse of $ZW^H U$ may be expressed $$(ZW^H U)^{-1} = YTX^H, \quad (11)$$

in which "T" is a diagonal matrix containing the reciprocals of the singular values $$T_{i,j} = 1/S_{i,j}. \quad (12)$$

Figure 8A:
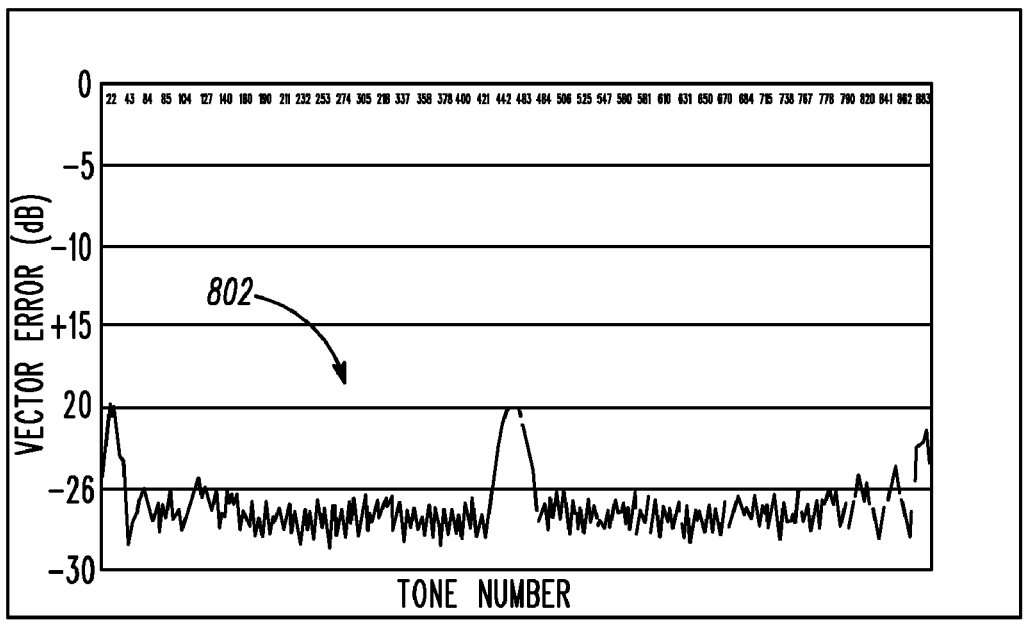
FIGS. 8a-8b are diagrams illustrating an improvement in per-tone vector error that may be achieved using the disclosed channel estimation technique.
Figure 8B:
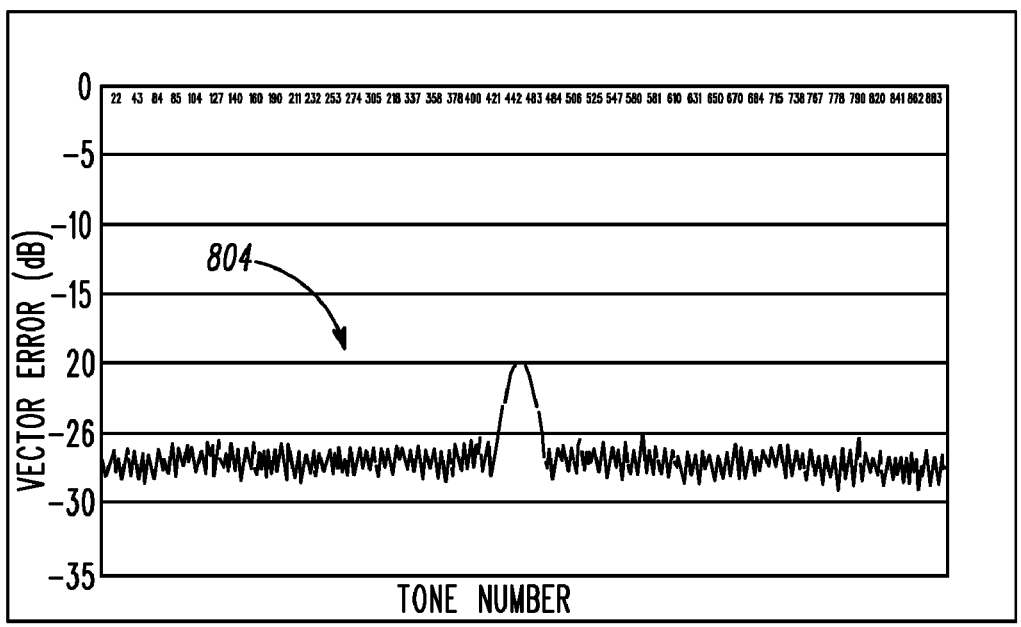

FIG. 8a illustrates per-tone vector error 802 for a wireless communications system employing a conventional channel estimation technique, and FIG. 8b illustrates per-tone vector error 804 for a wireless communications system employing the presently disclosed channel estimation technique. Those of ordinary skill in this art will appreciate that the vector error can be determined by calculating the RMS (root mean square) value of the spread of detected symbols (constellation points) around the ideal (unperturbed) value of the symbols. For example, the receive demodulator included in the wireless communications system may obtain a measurement of the vector error by measuring the signal-to-noise and distortion (SINAD) for the channel of interest. As shown in FIG. 8b, the per-tone vector error 804 corresponding to the disclosed channel estimation technique exhibits a reduced level of distortion, i.e., ringing, near the edges of the frequency band compared to the per-tone vector error 802 (see FIG. 8a) corresponding to the conventional channel estimation technique. Such reduced distortion of the channel estimate may result in a lower correctable FEC rate, and/or increased sensitivity for higher rate modes, particularly, when the pilot tones are offset from the center frequency.

Figure 9:
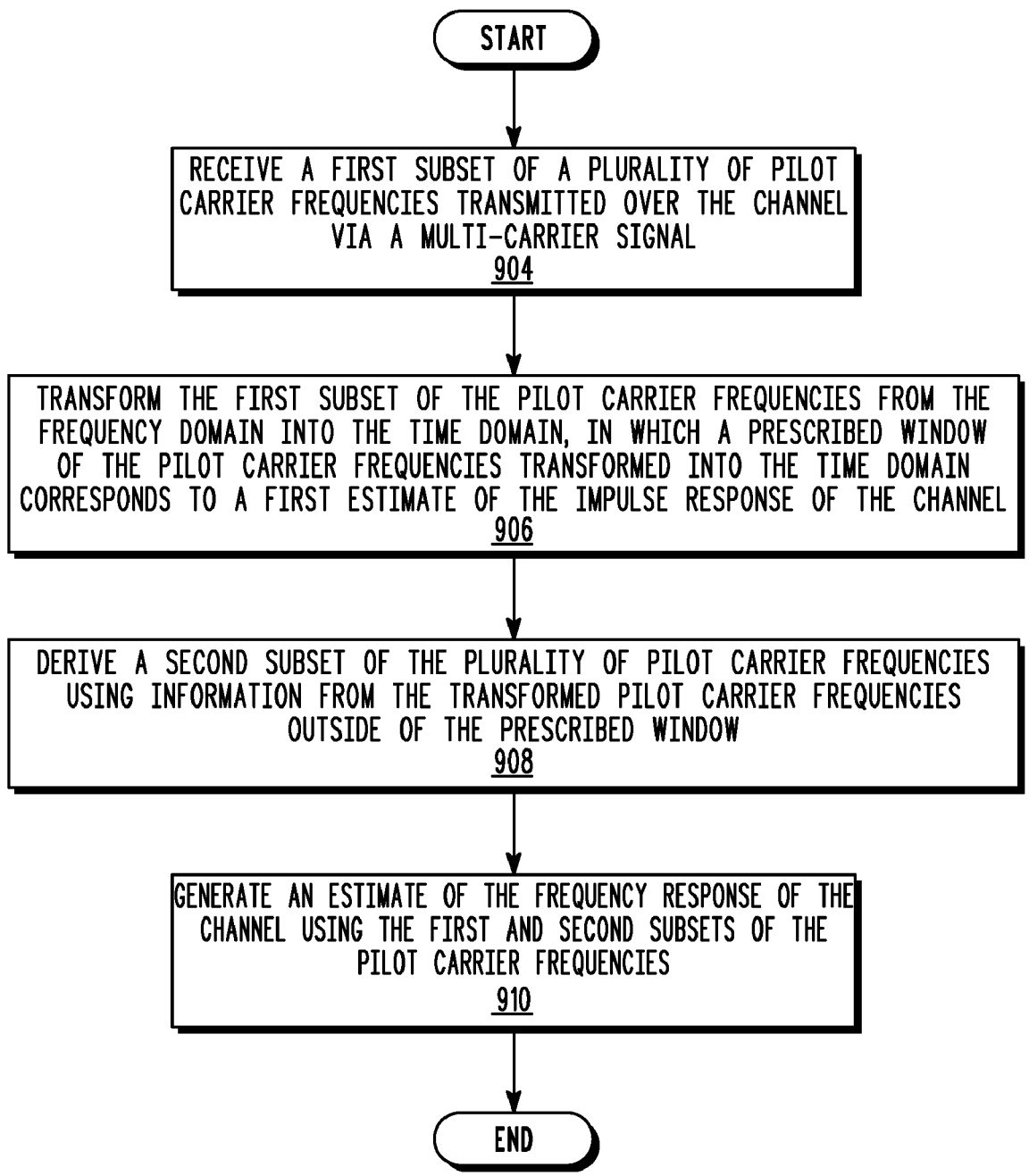
FIG. 9 is a flow diagram of a method of performing channel estimation according to an embodiment of the present invention.

A method of performing the presently disclosed channel estimation technique is described below with reference to FIG. 9. A multi-carrier signal including a plurality of pilot carrier frequencies is transmitted over a channel within a wireless communications system. As depicted in step 904, a first subset of the plurality of pilot carrier frequencies transmitted over the channel is received. At step 906, the first subset of the pilot carrier frequencies is then transformed from the frequency domain into the time domain, in which a prescribed window of the pilot carrier frequencies transformed into the time domain corresponds to a first estimate of the impulse response of the channel. Next, a second subset of the plurality of pilot carrier frequencies is derived using information from the transformed pilot carrier frequencies outside of the prescribed window, as depicted in step 908. Finally, an estimate of the frequency response of the channel is generated using the first and second subsets of the pilot carrier frequencies, as depicted in step 910.

It is noted that the information outside of the prescribed window of the pilot carrier frequencies transformed into the time domain may be expressed as $$\underline{x}_{1e} = ZW^H K \underline{y}_k, \quad (13)$$

in which "Z" is a mapping matrix for selecting a plurality of elements of the impulse response that are known to be zero, "$W^H$" is a Hermitian transpose of a matrix of Fourier coefficients, "K" is a mapping matrix for mapping the first subset of the pilot carrier frequencies into the final estimate of the channel frequency response, and "$\underline{y}_k$" is a vector of the first subset of the pilot carrier frequencies (i.e., the "known" pilot carrier frequencies). The information $\underline{x}_{1e}$ may also be multiplied by the expression "$-YTX^H$" to obtain a vector "$\underline{y}_r$" of the second subset of the pilot carrier frequencies (i.e., the "reconstructed" pilot carrier frequencies). For example, the vector $\underline{y}_r$ may be expressed as $$\underline{y}_r = -(YTX^H)ZW^H K\underline{y}_k, \quad (14)$$

in which "X" and "Y" are orthogonal matrices, "$X^H$" is a Hermitian transpose of the orthogonal matrix X, and "T" is a diagonal matrix including reciprocals of a plurality of singular values. In equation (14) above, "$YTX^H$" may be expressed as $$YTX^H = (ZW^H U)^{-1}, \quad (15)$$

in which "U" is a mapping matrix for mapping the second subset of the pilot carrier frequencies into the final estimate of the channel frequency response.

It is further noted that a first estimate "$\underline{y}_{1e}$" of the channel frequency response may be generated using the vector $\underline{y}_k$ of the first subset of the pilot carrier frequencies and the vector $\underline{y}_r$ of the second subset of the pilot carrier frequencies. For example, the first estimate $\underline{y}_{1e}$ of the channel frequency response may be expressed as $$\underline{y}_{1e} = K\underline{y}_k + U\underline{y}_r, \quad (16)$$

in which "U" is a mapping matrix for mapping the second subset of the pilot carrier frequencies into the final estimate of the channel frequency response. In addition, a second estimate "$\underline{x}_{2e}$" of the channel impulse response may be generated by transforming the first estimate $\underline{y}_{1e}$ of the channel frequency response from the frequency domain into the time domain, and inserting zeros in the second estimate $\underline{x}_{2e}$ in locations corresponding to the second subset of the pilot carrier frequencies. The second estimate $\underline{x}_{2e}$ of the channel impulse response may then be transformed from the time domain into the frequency domain to generate the final estimate of the channel frequency response.

It will further be appreciated by those of ordinary skill in the art that modifications to and variations of the above-described OFDM channel estimator may be made without departing from the inventive concepts disclosed herein. Accordingly, the invention should not be viewed as limited except as by the scope and spirit of the appended claims.

What is claimed is:

1. A method of estimating a frequency response of at least one channel in a wireless communications system, comprising the steps of:
  receiving a first subset of a plurality of pilot carrier frequencies transmitted over said channel via a multi-carrier signal;
  transforming the first subset of said plurality of pilot carrier frequencies from frequency domain into time domain, wherein a prescribed window of the transformed pilot carrier frequencies corresponds to a first estimate of the impulse response of said channel;
  deriving a second subset of said plurality of pilot carrier frequencies using information from the transformed pilot carrier frequencies outside of the prescribed window; and
  generating an estimate of the frequency response of said channel using the first and second subsets of said plurality of pilot carrier frequencies.

2. The method of claim 1 wherein the receiving step comprises receiving the first subset of the plurality of pilot carrier frequencies over said channel within an orthogonal frequency division modulation (OFDM) symbol structure.

3. The method of claim 2 wherein the receiving step comprises receiving the first subset of said plurality of pilot carrier frequencies over said at least one channel, wherein said at least one channel comprises a plurality of orthogonal channels.

4. The method of claim 1 wherein said channel has a maximum delay spread corresponding to the prescribed window of the transformed pilot carrier frequencies.

5. The method of claim 1 wherein the size of the prescribed window of the transformed pilot carrier frequencies corresponds to a total number of said plurality of pilot carrier frequencies.

6. The method of claim 1 wherein the deriving step comprises expressing the information from the transformed pilot carrier frequencies outside of the prescribed window as "$\underline{x}_{1e} = ZW^H K\underline{y}_k$", wherein "Z" is a mapping matrix for selecting a plurality of elements of the impulse response that are known to be zero, "$W^H$" is a Hermitian transpose of a matrix of Fourier coefficients, "K" is a mapping matrix for mapping the first subset of said plurality of pilot carrier frequencies into the final estimate of the frequency response of said channel, and "$\underline{y}_k$" is a vector of the first subset of said plurality of pilot carrier frequencies.

7. The method of claim 6 wherein the deriving step comprises multiplying the information $\underline{x}_{1e}$ by "$-YTX^H$" to obtain a vector "$\underline{y}_r$" of the second subset of said plurality of pilot carrier frequencies, the vector $\underline{y}_r$ being expressible as "$\underline{y}_r = -(YTX^H)ZW^H K\underline{y}_k$", wherein "X" and "Y" are orthogonal matrices, "$X^H$" is a Hermitian transpose of the orthogonal matrix X, and "T" is a diagonal matrix comprising reciprocals of a plurality of singular values.

8. The method of claim 7 wherein "$YTX^H$" is expressible as

"$YTX^H = (ZW^H U)^{-1}$",

"U" being a mapping matrix for mapping the second subset of said plurality of pilot carrier frequencies into the final estimate of the frequency response of said channel.

9. The method of claim 7 further comprising generating a first estimate "$\underline{y}_{1e}$" of the frequency response of said channel using the vector "$\underline{y}_k$" of the first subset of said plurality of pilot carrier frequencies and the vector "$\underline{y}_r$" of the second subset of said plurality of pilot carrier frequencies.

10. The method of claim 9 wherein the first estimate $\underline{y}_{1e}$ of the frequency response of said channel is expressible as "$\underline{y}_{1e} = K\underline{y}_k + U\underline{y}_r$", "U" being a mapping matrix for mapping the second subset of said plurality of pilot carrier frequencies into the final estimate of the frequency response of said channel.

11. The method of claim 9 further comprising generating a second estimate "$\underline{x}_{2e}$" of the impulse response of said channel by transforming the first estimate $\underline{y}_{1e}$ of the frequency response of said channel from the frequency domain into the time domain.

12. The method of claim 11 wherein the step of generating the second estimate "$\underline{x}_{2e}$" of the impulse response of said channel comprises inserting zeros in the second estimate $\underline{x}_{2e}$ in locations corresponding to the second subset of said plurality of pilot carrier frequencies.

13. The method of claim 11 wherein the step of generating the estimate of the frequency response of said channel using the first and second subsets of said plurality of pilot carrier frequencies comprises transforming the second estimate $\underline{x}_{2e}$ of the impulse response of said channel from the time domain into the frequency domain.

14. A system for estimating a frequency response of at least one channel in a wireless communications system, comprising:
- at least one transmitter operative to transmit a multi-carrier signal comprising a plurality of pilot carrier frequencies over said channel;
- at least one receiver operative to receive a first subset of said plurality of pilot carrier frequencies transmitted over said channel via the multi-carrier signal; and
- at least one processor operative to:
- process data corresponding to the first subset of said plurality of pilot carrier frequencies,
- transform the first subset of said plurality of pilot carrier frequencies from frequency domain into time domain, wherein a prescribed window of the transformed pilot carrier frequencies corresponds to a first estimate of the impulse response of said channel;
- derive a second subset of said plurality of pilot carrier frequencies using information from the transformed pilot carrier frequencies outside of the prescribed window; and
- generate an estimate of the frequency response of said channel using the first and second subsets of said plurality of pilot carrier frequencies.

15. The system of claim 14 wherein said at least one transmitter is operative to transmit the multi-carrier signal comprising said plurality of pilot carrier frequencies over said channel within an orthogonal frequency division modulation (OFDM) symbol structure.

16. The system of claim 15 wherein said at least one channel includes a plurality of orthogonal channels.

17. The system of claim 14 wherein said channel has a maximum delay spread corresponding to the prescribed window of the transformed pilot carrier frequencies.

18. The system of claim 17 wherein the size of the prescribed window of the transformed pilot carrier frequencies corresponds to a total number of said plurality of pilot carrier frequencies.

19. The system of claim 14 wherein said program is operative to express the information from the transformed pilot carrier frequencies outside of the prescribed window as "$\underline{x}_{1e} = ZW^H K \underline{y}_k$", wherein "Z" is a mapping matrix for selecting a plurality of elements of the impulse response that are known to be zero, "$W^H$" is a Hermitian transpose of a matrix of Fourier coefficients, "K" is a mapping matrix for mapping the first subset of said plurality of pilot carrier frequencies into the final estimate of the frequency response of said channel, and "$\underline{y}_k$" is a vector of the first subset of said plurality of pilot carrier frequencies.

20. The system of claim 19 wherein said program is operative to multiply the information $\underline{x}_{1e}$ by "$-YTX^H$" to obtain a vector "$\underline{y}_r$" of the second subset of said plurality of pilot carrier frequencies, the vector $\underline{y}_r$ being expressible as "$\underline{y}_r = -(YTX^H) ZW^H K \underline{y}_k$", wherein "X" and "Y" are orthogonal matrices, "$X^H$" is a Hermitian transpose of the orthogonal matrix X, and "T" is a diagonal matrix comprising reciprocals of a plurality of singular values.

21. The system of claim 20 wherein "$YTX^H$" is expressible as

"$YTX^H = (ZW^H U)^{-1}$",

"U" being a mapping matrix for mapping the second subset of said plurality of pilot carrier frequencies into the final estimate of the frequency response of said channel.

22. The system of claim 20 wherein said program is operative to generate a first estimate "$\underline{y}_{1e}$" of the frequency response of said channel using the vector "$\underline{y}_k$" of the first subset of said plurality of pilot carrier frequencies and the vector "$\underline{y}_r$" of the second subset of said plurality of pilot carrier frequencies.

23. The system of claim 22 wherein the first estimate $\underline{y}_{1e}$ of the frequency response of said channel is expressible as "$\underline{y}_{1e} = K \underline{y}_k + U \underline{y}_r$", "U" being a mapping matrix for mapping the second subset of said plurality of pilot carrier frequencies into the final estimate of the frequency response of said channel.

24. The system of claim 22 wherein said program is operative to generate a second estimate "$\underline{x}_{2e}$" of the impulse response of said channel by transforming the first estimate $\underline{y}_{1e}$ of the frequency response of said channel from the frequency domain into the time domain.

25. The system of claim 24 wherein said program is operative to insert zeros in the second estimate $\underline{x}_{2e}$ of the impulse response of said channel in locations corresponding to the second subset of said plurality of pilot carrier frequencies.

26. The system of claim 24 wherein said program is operative to generate the estimate of the frequency response of said channel by transforming the second estimate $\underline{x}_{2e}$ of the impulse response of said channel from the time domain into the frequency domain.

27. A receiver for estimating a frequency response of at least one channel in a wireless communication system comprising an antenna for receiving data and at least one processor:
- process data corresponding to the first subset of said plurality of pilot carrier frequencies;
- transform the first subset of said plurality of pilot carrier frequencies from frequency domain into time domain, wherein a prescribed window of the transformed pilot carrier frequencies corresponds to a first estimate of the impulse response of said channel;
- derive a second subset of said plurality of pilot carrier frequencies using information from the transformed pilot carrier frequencies outside of the prescribed window; and
- generate an estimate of the frequency response of said channel using the first and second subsets of said plurality of pilot carrier frequencies.

* * * * *

UNITED STATES PATENT AND TRADEMARK OFFICE
CERTIFICATE OF CORRECTION

PATENT NO.        : 7,630,450 B2
APPLICATION NO.   : 11/422643
DATED             : December 8, 2009
INVENTOR(S)       : Duncan Page 1 of 1

It is certified that error appears in the above-identified patent and that said Letters Patent is hereby corrected as shown below:

IN THE DRAWINGS:

1. In Fig. 5, Sheet 3 of 6, delete " 1.4 " and insert -- 1.2 --, therefor.

2. In Fig. 8A, Sheet 5 of 6, delete " -30 " and insert -- -30 --, therefor.

3. In Fig. 8B, Sheet 5 of 6, delete " -30 " and insert -- -30 --, therefor.

IN THE CLAIMS:

4. In Column 14, Line 39, in Claim 27, delete "communication" and insert -- communications --, therefor.

5. In Column 14, Lines 40-41, in Claim 27, delete "processor:" and insert -- processor operative to: --, therefor.

Signed and Sealed this
Twenty-second Day of March, 2011

David J. Kappos
*Director of the United States Patent and Trademark Office*